(12) United States Patent
Andersen et al.

(10) Patent No.: US 9,610,609 B2
(45) Date of Patent: Apr. 4, 2017

(54) METHOD FOR COATING PLASTIC SUBSTRATES

(71) Applicant: BASF Coatings GmbH, Münster (DE)

(72) Inventors: Audrée Andersen, Münster (DE); Fatmir Raka, Münster (DE)

(73) Assignee: BASF Coatings GmbH, Münster (DE)

( * ) Notice: Subject to any disclaimer, the term of this patent is extended or adjusted under 35 U.S.C. 154(b) by 395 days.

(21) Appl. No.: 14/355,069

(22) PCT Filed: Oct. 30, 2012

(86) PCT No.: PCT/EP2012/071504
§ 371 (c)(1),
(2) Date: Apr. 29, 2014

(87) PCT Pub. No.: WO2013/064506
PCT Pub. Date: May 10, 2013

(65) Prior Publication Data
US 2014/0322539 A1      Oct. 30, 2014

Related U.S. Application Data

(60) Provisional application No. 61/553,276, filed on Oct. 31, 2011.

(30) Foreign Application Priority Data

Oct. 31, 2011 (EP) .................................... 11187279

(51) Int. Cl.
| | |
|---|---|
| *B05D 3/02* | (2006.01) |
| *B05D 3/08* | (2006.01) |
| *C08J 7/04* | (2006.01) |
| *C08J 7/12* | (2006.01) |

(52) U.S. Cl.
CPC ............ *B05D 3/08* (2013.01); *B05D 3/0218* (2013.01); *C08J 7/042* (2013.01); *C08J 7/047* (2013.01); *C08J 7/12* (2013.01); *Y10T 428/31507* (2015.04); *Y10T 428/31587* (2015.04)

(58) Field of Classification Search
CPC .. C09D 175/04; C09D 151/08; C09D 175/14; C09D 151/003
See application file for complete search history.

(56) References Cited

U.S. PATENT DOCUMENTS

| | | | |
|---|---|---|---|
| 2004/0077750 A1* | 4/2004 | Sapper | ................... B05D 7/544 523/171 |
| 2004/0142115 A1* | 7/2004 | Jaworek | ............... B05D 3/0209 427/508 |
| 2005/0223945 A1* | 10/2005 | Baumgart | .......... C08G 18/6254 106/481 |
| 2006/0222873 A1 | 10/2006 | Leu | |
| 2007/0106019 A1* | 5/2007 | Schwarte | ............ C08F 283/006 524/589 |

FOREIGN PATENT DOCUMENTS

| | | |
|---|---|---|
| CN | 101670332 | 3/2010 |
| EP | 1113040 | 7/2001 |

OTHER PUBLICATIONS

PCT International Preliminary Report on Patentability and Written Opinion in PCT/EP2012/071504, mailed May 15, 2014, 7 pages.
PCT International Search Report PCT/EP2012/071504, mailed Jan. 16, 2013, 2 pages.

\* cited by examiner

Primary Examiner — Gregory Webb
(74) *Attorney, Agent, or Firm* — Servilla Whitney LLC

(57) ABSTRACT

Provided are methods for coating plastic substrates with an aqueous coating composition comprising at least one organic polymer as binder, the coating composition being applied to the surface of the plastic substrate and being subsequently cured, wherein the plastic substrate is pretreated before the coating composition is applied, the pretreatment comprising the two following separate steps in the order stated:

(A) heat-treating a plastic substrate at an ambient temperature in the range from 60° C. to 160° C. for a period in the range from 1 minute to 20 minutes, (B) flaming the surface of the plastic substrate pretreated as per step (A), there being a period of up to 90 minutes between the ending of step (A) and the beginning of step (B).

Additionally, provided are coated plastic substrates that have been coated by the methods of the invention.

16 Claims, No Drawings

METHOD FOR COATING PLASTIC SUBSTRATES

CROSS-REFERENCE TO RELATED APPLICATIONS

This application is the National Stage entry of PCT/EP2012/071504, filed on Oct. 30, 2012, which claims priority to European Application Number 11187279.2, filed on Oct. 31, 2011, and U.S. Provisional Application No. 61/553,276, filed on Oct. 31, 2011, which are incorporated herein by reference in their entireties.

FIELD

The present invention relates to a method for coating plastic substrates with an aqueous coating composition. The method may find application, for example, in the vehicle finishing segment, as for example in the painting of vehicle components and vehicle accessory components.

BACKGROUND

Plastics have become established within vehicle finishing as materials for vehicle components and also vehicle accessory components and components for installation in or on vehicles, both in the interior and in the exterior areas. Like other materials, plastics are coated or painted for decorative reasons (coloring, for example) and/or on account of technical suitability (light stability and weather resistance, for example) with corresponding coating compositions. One important requirement of a high-quality coating is its adhesion to the substrate surface. It is common knowledge that, particularly with the coating or painting of plastics, especially of apolar plastics, such as polypropylene (PP) in pure form or in modified form (through addition, for example, of ethylene-propylene-diene copolymers (EPDM)), problems of adhesion, in some cases serious, to the plastic substrate may occur. In order to achieve acceptable adhesion of the coating composition in question, apolar plastics of these kinds are conventionally subjected to a surface-activating pretreatment. The most frequently employed methods are flaming, plasma treatment, and corona discharge. Likewise known for the purpose of improving adhesion is the use of adhesion-promoting substances, especially chlorinated polyolefins. The adhesion-promoting substances are employed, for example, by way of adhesion primers, which comprise the adhesion-promoting substances and are applied to the plastic substrate in a separate coating operation. Likewise possible is the direct addition of adhesion-promoting substances to the coating composition with which the decorative and/or technically suitable coating is to be produced.

Even in the case of surface-activating pretreatment, the adhesion of coating compositions to plastic substrates is not always sufficient, and so, for example, weathering effects or mechanical stress cause successive delamination of coatings from painted plastics components. Nor does the use of adhesion-promoting substances lead to optimum adhesion properties in every case. A further factor is that the use of adhesion-promoting substances, especially chlorinated polyolefins, is very disadvantageous from an environmental standpoint. When aqueous coating compositions are used, which are becoming increasingly established for environmental reasons in the coating of plastics as well, the adhesion problems are exacerbated, especially in the painting of apolar plastic substrates, owing to the differences in polarity between the two media: the plastic substrate and the coating composition.

Patent application DE 199 61 983 A1 discloses a method for coating plastics, especially apolar plastics, with water-based, adhesion-promoting coating materials, the coatings obtained by the method exhibiting effective adhesion. Prior to the application of the coating materials, however, the plastic substrate must be cleaned with at least one specific organic solvent. Prior to the cleaning, there may be a heat-treatment operation on the substrate, with the temperature and time conditions stated for the operation being situated in the range from 50 to 80° C. for about 30 to 90 minutes. Cleaning is generally followed by an operation to evaporate the organic solvents used for cleaning, in the time range of one or more hours, before the coating material is applied. The coating material, moreover, comprises at least one adhesion promoter, especially a chlorinated polyolefin.

SUMMARY

Provided are methods for coating plastic substrates, including pre-treating the substrates before applying a coating composition. Also provided are coated plastic substrates obtained by the methods disclosed herein.

Object of the Invention

It was an object of the present invention to provide a method for coating plastic substrates with an aqueous coating composition that allows plastic substrates to be provided with a coating or paint film whose adhesion to the plastic substrate in question is excellent. The adhesion of the coatings produced by the method of the invention ought more particularly to be substantially better than that of paint films applied to plastic substrates which have undergone conventional pretreatment by means of flaming. At the same time it is an object of the invention to be able to avoid the use of adhesion-promoting substances, especially chlorinated polyolefins. In spite of this, the outstanding adhesion properties described ought to be achieved in that case. Furthermore, it is to be possible, using the method, to achieve the aforementioned properties, more particularly the excellent adhesion, while at the same time being able to employ a substrate pretreatment that takes up little time in comparison to the prior art. In particular it is to be possible to forgo the cleaning of the substrate surface with organic solvents. As a result, the possibility is provided of using the method with particular advantage in the context of painting operations where a high throughput rate is desired. Particularly noteworthy in this context is the automotive OEM finishing segment.

DETAILED DESCRIPTION

Achievement According to the Invention

In accordance with the invention the object is achieved by a method for coating plastic substrates with an aqueous coating composition comprising at least one organic polymer as binder, the coating composition being applied to the surface of the plastic substrate and being subsequently cured,
characterized in that
the plastic substrate is pretreated before the coating composition is applied, the pretreatment comprising the two following separate steps in the order stated:

(A) heat-treating a plastic substrate at an ambient temperature in the range from 60° C. to 160° C. for a period in the range from 1 minute to 20 minutes, (B) flaming the surface of the plastic substrate pretreated as per step (A), there being a period of up to 90 minutes between the ending of step (A) and the beginning of step (B).

The method for coating plastic substrates is identified below as the method of the invention. Further, preferred embodiments of the method of the invention will become apparent from the description that follows.

It has been found that the method of the invention, or the associated two-stage pretreatment of the plastic substrates, results in coatings which possess excellent adhesion to plastic substrates, especially apolar plastic substrates. More particularly, the adhesion achieved is better than that to plastic substrates which have been pretreated solely by flaming. Moreover, there is no need for a mandatory cleaning of the substrate surface with organic solvents before the coating composition is applied, in order to achieve effective adhesion. Since the pretreatment takes only a little time, the method can be employed especially in the context of painting operations where a high throughput rate is desirable and important. Mention may be made in this context, for example, of automotive OEM finishing.

Aqueous Coating Composition

As the aqueous coating composition in the context of the method of the invention it is possible to use the coating compositions that are familiar to the skilled person. The coating composition comprises at least one organic polymer as binder. These organic polymers are, for example, the polyurethane, polyester and/or epoxy resins that are known to the skilled person. Likewise possible is the use of polyacrylate and polymethacrylate resins (identified below as poly(meth)acrylate resins) that are known per se. The stated organic polymers as binders preferably further comprise different functional groups for chemical crosslinking, with hydroxyl groups being preferred. Preference is given to polyurethane, polyester and/or poly(meth)acrylate resins containing preferably hydroxyl groups for use as binders. Organic polymers and resins of these kinds are described in Römpp-Lexikon Lacke and Druckfarben, Georg Thieme Verlag, Stuttgart, N.Y., 1998, pages 73 to 74, for example. The dispersibility of the organic polymers or resins in water may be implemented via the measures that are familiar to the skilled person. These measures may involve the ionic modification of the organic polymers through introduction of monomers containing, for example, carboxylate or sulfonate groups. Also possible is the nonionic modification by means, for example, of polyglycol ether chains, or the use of certain additives, described later on below, such as dispersants, examples being emulsifiers.

The organic polymers may be physically curing and/or chemically curing, i.e., chemically crosslinking. In the latter case, the organic polymers may be self-crosslinking and/or externally crosslinking. This means that the complementary functional groups, which under curing conditions, heat for example, react and thereby form a crosslinked coating film, may be present in one and the same organic polymer (self-crosslinking). Also possible, however, is for the complementary functional groups to be present in different compounds (externally crosslinking).

In the case of externally crosslinking systems, for example, in addition to the resin systems recited above, crosslinkers present in the aqueous coating composition are, in addition, fully etherified and/or partially etherified amino resins, monomeric and/or polymeric polyamines and also monomeric and/or polymeric, blocked and/or free polyisocyanates. In the context of the method of the invention it is preferred to use fully etherified and/or partially etherified amino resins, especially preferably fully etherified and/or partially etherified melamine-formaldehyde resins.

The selection and combination of suitable organic polymers and monomers, for example of suitable polyurethane, polyester, poly(meth)acrylate and/or epoxy resins with suitable functional groups, preferably hydroxyl groups, and optionally amino resins, polyamines and/or polyisocyanates takes place in accordance with the desired and/or required properties of the coating system to be produced. Another criterion for selection are the desired and/or required curing conditions, more particularly the curing temperatures. The way in which such a selection is to be made is known to the skilled person in the art and may be adapted accordingly by this skilled person. Possibilities here include the one-component and also two-component coating systems that are known per se (in this regard see also Römpp-Lexikon Lacke and Druckfarben, Georg Thieme Verlag, Stuttgart, N.Y., 1998, pages 274-276, and also pages 641-642). Preference is given to the use of one-component systems.

Particularly preferred in the context of the method of the invention is the use of a combination of at least one hydroxy-functional polyurethane, polyester and/or poly(meth)acrylate resin as binder and at least one fully etherified and/or partially etherified melamine-formaldehyde resin as crosslinker.

The fraction of all the film-forming components, more particularly of the at least one hydroxy-functional polyurethane, polyester and/or poly(meth)acrylate resin as binder and of the at least one fully etherified and/or partially etherified melamine-formaldehyde resin as crosslinker, is advantageously in the range from 10% to 90% by weight, more particularly from 15% to 60% by weight, very preferably in the range from 20% to 50% by weight, based in each case on the total amount of the aqueous coating composition. The fraction of a resin as binder and of a crosslinker, considered separately in each case, is advantageously not below 3% by weight, based on the total amount of the aqueous coating composition.

The aqueous coating composition may further comprise at least one customary and known coloring and/or effect-imparting pigment. The coating composition advantageously comprises at least one pigment.

Examples of such pigments are inorganic-based pigments, such as titanium dioxide, iron oxide and carbon black, for example, or else customary metallic pigments (examples being commercial aluminum bronzes, stainless steel bronzes) and nonmetallic effect pigments (examples being pearlescent pigments and interference pigments). Organic-based coloring pigments as well, such as azo pigments and phthalocyanine pigments, may be employed. The pigments fraction in the coating composition is situated for example in the range from 0% to 20% by weight, preferably 2% to 10% by weight, based in each case on the total amount of the aqueous coating composition. The nature and amount to be used of pigments are selected in the manner familiar to the skilled person, the selection being guided by the required or desired properties of the coating composition. As a supplement in this regard, reference may be made to Römpp-Lexikon Lacke and Druckfarben, Georg Thieme Verlag, Stuttgart, N.Y., 1998, page 451.

Besides water, the aqueous coating compositions may further comprise organic solvents as well. Present may be, for example, aliphatic and/or aromatic hydrocarbons such as toluene, xylene, solvent naphtha, Solvesso 100, Shellsol A, ketones such as acetone, methyl ethyl ketone or methyl amyl ketone, esters, such as ethyl acetate, butyl acetate, pentyl acetate or ethyl ethoxypropionate, ethers such as butylglycol, dipropylene glycol methyl ether, alcohols such as ethylhexanol, butoxypropanol, isopropanol or butyldiglycol, or mixtures of the aforementioned solvents. It is preferred to use water-miscible organic solvents.

The coating composition to be used is aqueous. Aqueous is a particularization, familiar to the skilled person, of coating compositions which as solvents comprise not exclusively organic solvents, but instead are also based on water as solvent. Aqueous in the context of the present invention means more particularly that the coating composition contains at least 10% by weight, preferably at least 20% by weight, very preferably at least 25% by weight of water, based in each case on the total amount of the coating composition. With particular preference, aqueous should be understood to mean that, in addition to the stated requirement of "at least 10% by weight (or at least 20% or 25% by weight) of water, based on the total amount of the coating composition", a further requirement to be met is that the fraction of organic solvents in the coating composition is less than 25% by weight, more particularly of less than 20% by weight, based in each case on the total amount of the coating composition.

Furthermore, in the aqueous coating composition, there may be at least one coatings additive present that is known per se. Such coatings additives are for example, but not exclusively,
    defoamers,
    reactive diluents,
    polymerization inhibitors,
    slip additives,
    wetting agents such as siloxanes, fluorine-containing compounds, carboxylic monoesters,
    catalysts, such as acidic, phosphorus-containing catalysts based on, for example, substituted phosphonic diesters or substituted phosphoric esters,
    flow control agents,
    rheology control additives,
    dispersants,
    UV stabilizers,
    fillers such as silicon dioxide, aluminum silicate or barium sulfate,
    and/or flame retardants.

Coatings additives of these kinds are available in commerce from different suppliers, for example. The fraction of a particular additive is advantageously not more than 10% by weight, more particularly not more than 5% by weight, with particular preference not more than 3% by weight, based in each case on the total amount of the aqueous coating composition. Preferably the aqueous coating composition is substantially free from chlorinated polyolefins, more particularly substantially free from any adhesion-promoting substances. In the context of the present invention, "substantially free from" in relation to any particular substance(s) should be understood to mean that the aqueous coating composition contains not more than 5% by weight, more particularly not more than 2.5% by weight, with particular preference not more than 2.0% by weight, very preferably not more than 1.0% by weight, of the substance(s) in question, based in each case on the total amount of the coating composition. In one especially preferred embodiment the aqueous coating composition is completely free from chlorinated polyolefins, more particularly being completely free from any adhesion-promoting substances.

The aqueous coating composition is more particularly an aqueous basecoat material. A basecoat material, as is known, is a pigmented coating composition which can be used especially in automotive finishing, but also in general industrial coating, for the purpose of constructing a color-imparting coating, more particularly a color-imparting intermediate coating as part of a multicoat paint system on, for example, a plastic substrate. Constructed atop the intermediate coating thus constructed is then frequently a clearcoat, thereby producing the multicoat coating system.

Viewed in terms of its method, the preparation of the aqueous coating composition, more particularly of the aqueous basecoat material, has no particular features, but instead takes place in accordance with the customary and known techniques with the aid of customary and known mixing assemblies such as stirred tanks or dissolvers.

Plastic Substrates to be Used

The plastic substrates to be coated or painted by the method of the invention are substrates of customary plastics such as, for example, polystyrene (PS), polyvinyl chloride (PVC), polyurethane (PUR), glass fiber-reinforced unsaturated polyesters, polymethyl methacrylate (PMMA), polyphenylene sulfide (PPS), polyoxymethylene (POM), polyphenylene ethers (PPE), polyphenylene oxide (PPO), polyurea, polybutadiene terephthalate (PBT), polycarbonate (PC), acrylonitrile-butadiene-styrene copolymers (ABS), polyolefins such as polypropylene (PP) and polypropylene (PP) modified with ethylene-propylene-diene copolymers (EPDM). Also possible in this context are plastic substrates which comprise various of the plastics stated, hence mixtures of these plastics.

The method of the invention can be used with particular advantage for coating apolar plastics, such as, in particular, polyolefins such as PP and PP modified with EPDM fractions. The modification of PP with EPDM serves essentially to elastify the plastic and also has the effect, among others, of determining the paintability. With low EPDM fractions, the paintability or the adhesion is generally poor. Only with EPDM fractions of about 20% to 25% by weight are the plastics generally referred to as no longer being difficult to paint. The method of the invention, however, may be used with very particular advantage for the painting of polypropylene/EPDM plastics having low EPDM fractions of, for example, not higher than 25% by weight, more particularly not higher than 20% by weight.

The plastic substrates may be simple plastic sheets. Also possible as substrates, however, are vehicle bodies made of plastics, or certain vehicle components, and also vehicle accessory components and vehicle components for installation in or on vehicles, for both the vehicle interior and vehicle exterior areas.

Pretreatment of the Plastic Substrates

Prior to the application of the aqueous coating composition, the plastic substrates to be coated as part of the method of the invention undergo a pretreatment which comprises two separate steps (step (A) and step (B)) that are to be carried out one after the other. The pretreatment preferably consists of these two steps. This means more particularly that there are preferably no other specific pretreatment steps, such as, for example, cleaning with organic solvents or the treatment of the substrate surface with actinic radiation. Apart from the two steps (A) and (B), the substrate is merely transported, stored and/or packed.

In step (A) the respective plastic substrate is heat-treated at an ambient temperature in the range from 60° C. to 160° C., preferably in the range from 70° C. to 120° C. and more particularly in the range from 75° C. to 90° C. The heat treatment takes place for a period in the range from 1 minute to 20 minutes, preferably in the range from 3 minutes to 8 minutes, more particularly in the range from 4 minutes to 6 minutes.

In the context of the present invention, heat treatment refers to the storage of a material or an article at a particular ambient temperature, increased by comparison with the room temperature, for a certain period, during which the material in question retains its original shape and does not undergo deformation. The material or article in the context of the invention is a plastic substrate, as for example a plastic sheet or a plastic component defined as above and intended for use in vehicle construction. Ambient temperature in the context of the present invention is the temperature possessed by the room or the surroundings in which a plastic substrate is located—in other words, then, in which a plastic substrate is, for example, stored or in any way moved, worked or treated. Room temperature in the context of the present invention means an ambient temperature in the range from 10 to 30° C., more particularly 15 to 25° C., especially 20° C.

In the context of the invention, the heat treatment takes place for example in a forced-air oven with a closeable door. It must be ensured that conditions prevail under which the plastic substrate as a whole is exposed to an ambient temperature which is increased by comparison with the room temperature—that is, in the context of the invention, a temperature in the range from 60° C. to 160° C. Fluctuations in the ambient temperature come about preferably only as a result, for example, of the temporary opening of the closeable door of the forced-air oven, since such opening allows heat exchange between oven space and outside space, and the temperature in the oven after the door has been closed again has returned to the preset ambient temperature only after a certain period has elapsed.

After the end of the desired or required period of heat treatment, the plastic substrate is removed from the closed space having an ambient temperature increased by comparison with the room temperature, and hence the first part (step (A)) of the substrate pretreatment taking place in the context of the method of the invention is ended.

As already indicated above, it is self-evident that the plastic substrate retains its original shape and does not undergo deformation as part of the heat-treatment operation described. The temperature and possibly the period of heat treatment, more particularly the temperature, then, must be selected such that the plastic substrate in question is not heated to such a level, during heat treatment, that it undergoes deformation. The person skilled in the art, in any case, knows the temperature at which the plastic substrate deforms or from which the material in question undergoes softening. The appropriate conditions can therefore be adapted without problems to the corresponding case in hand.

The plastic substrate is heat-treated, as already indicated above, at an ambient temperature in the range from 60° C. to 160° C., but more particularly not more than at an ambient temperature which is at least 5° C., more particularly advantageously at least 10° C., lower than the Vicat softening temperature of the particular plastic substrate used. This preferred embodiment in which the ambient temperature during heat treatment is related to the Vicat softening temperature is confined, of course, to those plastic substrates whose Vicat softening temperature is at least 65° C., thus allowing the ambient temperature to be observed in accordance with the invention in step (A), in the range from 60° C. to 160° C., to be realized in any case.

The Vicat softening temperature is defined in accordance with DIN EN ISO 306 as the temperature at which a flattened, round needle tip having an area of 1 mm$^2$ penetrates the plastic material to a depth of 1 mm, the needle being subject to a force of 10 newtons and the plastic material being heated at a heating rate of 50° C. per hour.

In step (B) the plastic substrate pretreated according to step (A) is flamed. The entire surface or only part of the surface may be flamed. By flaming is meant the definition known to the skilled person. Accordingly, flaming refers to a procedure in which the oxidizing part of a flame is caused to act on the surface of a material or article, in this case a plastic substrate. Present in the flame passed over the plastic substrate, or in the oxidizing part of the flame, are oxygen not consumed in the combustion, oxygen which diffuses from the surroundings into the hot flame, and the typical combustion products (for example, $CO_2$, $H_2O$), partially in activated form. These very reactive radicals (e.g., O, OH) are able to break up the long-chain plastic molecules at the surface and to attach to the breakage points. This produces polar fractions in the molecules, thereby modifying, for example, the polarity, the surface tension and the wettability of the substrate. As a supplement, reference may be made to Römpp-Lexikon Lacke and Druckfarben, Georg Thieme Verlag, Stuttgart, N.Y., 1998, page 59.

The flame can be generated using typical flaming devices familiar to the skilled person, such as manual flaming devices, tunnel flaming units and robot-controlled flaming devices. The devices and units in question may be selected in accordance with the structural nature of the substrate to be flamed and with the desired throughput rate. For instance, manual flaming devices tend to be employed in areas where only small series of fairly low unit numbers require flaming. Where the pretreatment of large unit numbers of plastic substrates is desired, in the context of automotive OEM finishing, for example, it is possible for plastic sheets that require flaming to be conveyed by means of conveyor belts past a flaming device in fixed installation. It is likewise possible for components of complex shape to be pretreated by means of robot-controlled flaming assemblies. Commonly used flaming devices and flaming units are available, for example, from the company Kirchgässner Elektrotechnik, for example.

Parameters characteristic of the flaming are the distance of the flame from the component or from the material's surface (flame zone), the duration of exposure to the flame, and the flame setting (fuel gas/air mixing ratio). These parameters are familiar to the skilled person in the art and can be verified and/or optimized in accordance with the prevailing case in hand, without great cost or complexity. It is particularly advantageous in the context of the present invention to carry out flaming with a propane/air or methane/air mixture, with the respective fuel gas/air volume ratio being in the range from 1/15 to 1/40. The throughput of the fuel gas/air mixture, more particularly of the propane/air or methane/air mixture, may be situated, for example, in the range of 250 l/min-600 l/min, depending on the type and size of the particular flaming unit selected.

The substrate/flame distance is situated advantageously in the generally selected ranges, more particularly in a range from 0.01 to 15 cm, with particular advantage from 0.1 to 12 cm, very preferably from 0.5 to 10 cm.

The exposure time of the flame on the plastic substrate is likewise situated within the ranges known to the skilled person, and may be adapted by that person in accordance with the particular case in hand. The exposure time may be, for example, in the range from 0.01 to 0.5 second, preferably from 0.02 to 0.2 second, more particularly from 0.02 to 0.1 second.

Where the substrate to be flamed is conveyed on, for example, a conveyor belt, moving belt or else via a movable robot arm, to which the substrate is suctioned by reduced pressure generated via a vacuum pump, past a flaming unit in fixed installation, a variant preferred in accordance with the invention, the belt speed of the conveyor belt or the speed of the robot arm and the width of the flaming zone of the flaming unit—meaning the width of the zone in which the flame is able to act on the substrate—are advantageously selected such that the exposure time to the flame is within the range stated above.

Flaming may take place in a single flaming step. Also possible, however, is multiple flaming in a flaming cycle, in which case more particularly 2 to 10, more preferably 2 to 5, individual flaming steps are then carried out, in each case in accordance with the method described above. The times between the individual flaming steps in this case may in principle be selected freely; more particularly, the individual flaming steps take place rapidly one after another, meaning in times of 1 to 120 seconds, preferably 1 to 60 seconds, very preferably 1 to 30 seconds, after one another.

It is essential to the invention that between the ending of step (A) and the beginning of step (B) there is a period of not more than up to 90 minutes, preferably in the range from 1 minute to 60 minutes, more preferably in the range from 4 minutes to 40 minutes and very preferably in the range from 5 to 20 minutes.

Where the flaming (step (B)) is carried out in a flaming cycle with a plurality of flaming steps, the period between the ending of step (A) and the beginning of step (B) means the period up to the beginning of the first flaming step of the flaming cycle in step (B).

Production of Coatings on Plastic Substrates

The application of the aqueous coating composition to a plastic substrate pretreated as described above may take place by all customary application techniques, such as, for example, spraying, knifecoating, spreading, pouring, dipping, impregnating, trickling or rolling, preferably by means of spray application. In the course of such application, the plastic substrate to be coated may per se be at rest, with the application equipment or unit being moved. Alternatively the substrate to be coated may be moved, with the application unit being at rest relative to the substrate or being moved in an appropriate way. Preference is given to employing spray application methods, such as, for example, compressed air spraying (pneumatic application), airless spraying, high-speed rotation, electrostatic spray application (ESTA), optionally in conjunction with hot spray application such as hot air spraying, for example.

Application of the aqueous coating composition obviously takes place after the pretreatment. Between the end of the pretreatment and the beginning of the application there is advantageously a time of 5 minutes to 24 hours, very preferably a time of 20 minutes to 120 minutes.

The aqueous coating composition applied to the plastic substrate is cured, thereby producing a coating. Curing of the applied aqueous coating composition has no peculiarities in terms of method, but instead takes place in accordance with the customary and known techniques such as, for example, heating in a forced air oven or by irradiation with IR lamps. Also possible is actinic curing by means, for example, of UV radiation in the case of radiation-curing systems. The curing conditions, more particularly the curing temperatures, are guided, for example, by the temperature sensitivity of the plastic substrates used and also by the aqueous coating compositions that are used—in accordance, for example, with whether the particular aqueous coating composition used comprises self-crosslinking or externally crosslinking binders and optionally crosslinkers. Thus curing may take place, for example, in the region of the room temperature or else at elevated temperatures in the range of, for example, 40° C. to 120° C., preferably from 60° C. to 90° C. The period of the curing phase as well is selected individually and is dependent on factors including those already specified above (for example, choice of binders and/or of curing temperatures). Curing may take place, for example, over a time of 5 minutes to 120 minutes, preferably 10 minutes to 40 minutes. Curing may optionally also be preceded by a flashing phase or preliminary drying phase, at room temperature for a period of 1 to 60 minutes, for example. The particular curing conditions to be applied in the case of particular substrates and/or coating compositions are part of the general art knowledge, and so the conditions may be adapted and selected by the skilled person.

The aqueous coating composition is applied in the customary and known film thicknesses, as for example in wet film thicknesses of 10 to 200 micrometers, preferably of 50 to 150 micrometers. The resultant dry film thicknesses after curing are then, for example, in the range from 2 to 40 micrometers, more particularly 5 to 20 micrometers.

The present invention further provides a coated plastic substrate which is characterized in that it has been coated by the method of the invention.

The coating produced by the method of the invention on a plastic substrate may be the only coating on the plastic substrate in question, or else, on the coating produced by the process of the invention, there may be further coatings produced, thereby producing a multicoat coating system. This then means that the coated plastic substrate of the invention is coated with a multicoat coating system.

In one preferred embodiment of the invention, another coating composition is applied and cured on the coating produced by the method of the invention, and a further coating is produced. More particularly this is a clearcoat material and a clearcoat, respectively. As is known, a clearcoat material is a coating material which following application and curing forms a transparent coating (the clearcoat) having protective and/or decorative properties. By protective properties are meant, for example, scratch resistance and weathering stability, more particularly UV stability. An example of a decorative property is a good gloss. The clearcoat materials for use are the clearcoat materials which are customarily used in the art of plastics painting, and their selection and use is known to the skilled person (in this regard see also Römpp-Lexikon Lacke and Druckfarben, Georg Thieme Verlag, Stuttgart, N.Y., 1998, page 325). The general application and curing techniques for the further coating composition, more particularly the clearcoat material, correspond to those as described earlier on above for the aqueous coating composition. The multicoat coating system is produced preferably by wet-on-wet painting. This means that the further coating composition, more particularly the clearcoat material, is applied to the applied aqueous coating composition without the latter being cured separately beforehand. The two applied coating compositions are then cured jointly, resulting in the multicoat coating system, more particularly a two-coat coating system.

The further coating composition, more particularly the clearcoat material, is applied in the customary and known film thicknesses, as for example in wet film thicknesses of 50 to 250 micrometers, preferably of 100 to 180 micrometers. The resulting dry film thicknesses in this case, after curing, are then, for example, in the range from 15 to 80 micrometers, more particularly 25 to 50 micrometers.

Overall, therefore, the coated plastic substrates coated by the method of the invention are suitable for the esthetically and technically demanding field of vehicle finishing, more particularly of automotive finishing. The coated plastic substrates, more particularly the plastic substrates coated with a multicoat coating system, can be used as vehicle components and vehicle accessory components and components for installation in and on vehicles, for both the interior area and the exterior area of vehicles. In addition to outstanding adhesion of the coatings or multicoat coating systems produced, it is possible, in addition, to achieve a good and variable decorative effect.

The coatings or paint films produced by the method of the invention for coating plastic substrates possess, furthermore, an excellent adhesion. The adhesion, furthermore, is substantially better than the adhesion of coatings on plastic substrates which have been pretreated conventionally by exclusive flaming.

A more particularly advantageous feature of the method of the invention is that in the pretreatment of the plastic substrate there is no need for any separate preparatory cleaning of the plastic substrate using, for example, organic solvents; instead, the coating method of the invention leads even without such cleaning to coatings and paint systems which exhibit excellent adhesion.

The invention is elucidated in more detail by means of the examples which follow.

EXAMPLES

Various plastic substrates, in each case in the form of test plaques having a size of 10×10×0.3 cm or 100×100×3 cm, were coated with different aqueous coating compositions. The plastic materials used were different PP/EPDM blends and also a PC/ABS blend.
A) Pretreatment of Plastic Substrates
1.) Pretreatment by the Method of the Invention
Step (A):

The plastic plaques to be coated were heat-treated at 80° C. for 5 minutes. For that purpose the plaques were placed in a closeable oven preheated to 80° C., the oven door was closed, and, after 5 minutes had elapsed, the plaques were removed from the oven.
Step (B):

The heat-treated plastic plaques were then flamed at room temperature, using a commercial automatic flaming unit (from Kirchgässner Elektrotechnik). The flaming zone of the flaming unit had a width of 3 cm. The plastic plaques, suctioned to a robot arm, were conveyed vertically with a belt speed of 450 mm/s past the flame, with a substrate/flame distance of 7 cm. The flaming unit was operated with a propane/air volume ratio of 1:25, with a fuel gas/air mixture throughput of 425 l/min. Flaming took place in one flaming step; in other words, flaming was not carried out in a flaming cycle featuring a plurality of individual flaming steps. Between the ending of step (A) and the beginning of step (B) there was a period of 30 minutes.
2.) Comparative Pretreatment (A)

Further plastic substrates were pretreated in accordance with the procedure described under "1.) Step (A)". In other words, step (B) (flaming) was omitted.

3.) Comparative Pretreatment (B)

Further plastic substrates were pretreated in accordance with the procedure described under "1.) Step (B)". In other words, step (A) (heat treatment) was omitted
B) Coating of the Pretreated Plastic Substrates The aqueous coating composition used for coating was the aqueous basecoat material having the composition according to Table 1. The basecoat material was prepared by combining and intimately mixing the components indicated in Table 1, in a dissolver.

TABLE 1

Composition of the aqueous basecoat material used

| Component | Parts by weight used |
|---|---|
| Commercial thixotropic agent (Laponite RD) | 18.2 |
| Commercial dispersion of an OH-functional polyurethane resin (water content: 66.0% by weight, organic solvents: 6.3% by weight) | 31.9 |
| TMDD BG 52 (commercial wetting agent) | 0.5 |
| Commercial dispersion of an OH-functional polyester resin (water content: 17.7% by weight, organic solvents: 20.0% by weight) | 3.0 |
| Butoxypropanol | 2.0 |
| Cymel 327 (commercial melamine-formaldehyde resin) | 4.2 |
| Neutralizing solution (dimethylethanolamine, 10% in water) | 0.7 |
| Commercial dispersion of an OH-functional acrylate resin (water content: 49.5% by weight, organic solvents: 13.0% by weight) | 5.1 |
| Water | 2.1 |
| Foamstar MF324 (commercial defoamer) | 0.5 |
| Ethylhexanol | 3.9 |
| BYK 347 (commercial wetting agent) | 0.5 |
| Pluriol P900 (commercial polyethylene glycol) | 2.0 |
| Butyldiglycol | 4.7 |
| Isopropanol | 2.1 |
| Water | 1.8 |
| Neutralizing solution (dimethylethanolamine, 10% in water) | 0.8 |
| Water | 2.2 |
| Viscalex HV 30 (commercial rheological agent) | 0.4 |
| Water | 2.0 |
| Tinting paste 1 (10% dispersion of Monarch 1400 carbon black pigment in water) | 10.1 |
| Tinting paste 2 (50% dispersion of titanium rutile 2310 in water) | 0.1 |
| Water | 1.2 |

The aqueous basecoat material was applied pneumatically to different plastic substrates pretreated as described above, flashed off at 20° C. for 5 minutes and then baked at a temperature of 80° C. over a period of 10 minutes. The resulting dry film thickness was 15 micrometers. The period between the end of the pretreatment and the application of the coating composition was 30 minutes.
C) Investigation of the Adhesion Properties of Coatings The adhesion properties of the coatings produced were investigated by way of a widely known steam jet test (DIN 55662:2009-12, 1 minute of steam jetting at 60° C., pressure 67 bar, vertical distance from test specimen 10 cm). From each coating, defined by the plastic substrate and the pretreatment, a total of 6 samples were produced and were each investigated individually.

The adhesion was evaluated using a whole-number rating system with ratings of 0-5, the rating 0 being awarded for coatings which had no visible traces after steam jet treatment (very good adhesion), and the rating 5 being awarded for coatings which after the steam jet test had very comprehensively detached regions (insufficient adhesion).

Table 2 shows the adhesion properties of the coatings produced in relation to the plastic substrates used and their pretreatment. From the 6 individual ratings present in each case, the average was formed; the averages are stated after rounding to one decimal place.

TABLE 2

Adhesion properties of coatings, aqueous basecoat material on plastic substrates

| Plastic substrate | Pretreatment | Adhesion |
| --- | --- | --- |
| PP/EPDM 1[1] | Step (A) + Step (B) | 2.2 |
| PP/EPDM 1[1] | Step (A) | 5.0 |
| PP/EPDM 1[1] | Step (B) | 4.2 |
| PP/EPDM 2[2] | Step (A) + Step (B) | 1.3 |
| PP/EPDM 2[2] | Step (A) | 5.0 |
| PP/EPDM 2[2] | Step (B) | 4.5 |
| PC/ABS[3] | Step (A) + Step (B) | 0 |
| PC/ABS[3] | Step (A) | 5.0 |
| PC/ABS[3] | Step (B) | 3.0 |

[1] PP108MF10 (Sabic); PP/EPDM blend, 2% by weight EPDM
[2] PP 95610 (Sabic); PP/EPDM blend, 20% by weight EPDM
[3] Cycoloy C1100 HF (Sabic); PC/ABS blend, 40% by weight ABS The results shown demonstrate that the adhesion properties of the coatings produced by the method of the invention are substantially better than adhesion properties of coatings on plastic substrates which were pretreated exclusively by means of heat-treatment (step (A)) or flaming (Step (B)).

D) Investigation of Multicoat Coating Systems

Coatings on PP/EPDM plastic plaques were produced. The pretreatment of the substrates and also the application and flashing of the aqueous basecoat material indicated in Table 1 were carried out in analogy to the working instructions above (comparisons A) and B)). Before the basecoat material was cured, however, a commercial clearcoat material (compare Table 3) was applied pneumatically, and was subsequently flashed off at room temperature for 10 minutes. This was followed by the joint curing of the applied aqueous basecoat material (resulting dry film thickness 15 micrometers) and of the applied clearcoat material (resulting dry film thickness 35 micrometers) at a temperature of 80° C. over a period of 30 minutes.

TABLE 3

Composition of the clearcoat material used

| Component | Amount (in % by weight) |
| --- | --- |
| Commercial dispersion of an OH-functional acrylate resin in organic solvents | 50.9 |
| Setal 82166 SS-55 | 25.5 |
| Cyclohexanone | 3.9 |
| Solvent Naphtha 230/290 | 2.0 |
| Commercial dispersion of an OH-functional acrylate resin in organic solvents | 9.8 |
| Disolucion de Silicona F-2 | 1.5 |
| 5% strength solution of Baysilon OL44 | 0.5 |
| Tinuvin 292 (commercial light stabilizer) | 0.9 |
| Tinuvin 1130 (commercial UV absorber) | 0.9 |
| 1% strength solution of dibutyltin laurate | 0.6 |
| Cumyl hydroperoxide (80% form) | 0.4 |
| 1-Methoxyprop-2-yl acetate | 3.1 |

The resulting multicoat coating systems were investigated for their adhesion properties in analogy to the steam jet test indicated above.

Table 4 shows the corresponding results.

TABLE 4

Adhesion properties of multicoat coating systems, aqueous basecoat material + clearcoat material

| Plastic substrate | Pretreatment | Adhesion |
| --- | --- | --- |
| PP/EPDM 1[1] | Step (A) + Step (B) | 1.5 |
| PP/EPDM 1[1] | Step (A) | 5.0 |
| PP/EPDM 1[1] | Step (B) | 3.5 |
| PP/EPDM 2[2] | Step (A) + Step (B) | 0.7 |
| PP/EPDM 2[2] | Step (A) | 5.0 |
| PP/EPDM 2[2] | Step (B) | 2.2 |

[1] PP108MF10 (Sabic); PP/EPDM blend, 2% by weight EPDM
[2] PP 95610 (Sabic); PP/EPDM blend, 20% by weight EPDM The results shown demonstrate that the adhesion properties of the multicoat coating systems produced by the method of the invention are better than adhesion properties of multicoat coating systems on plastic substrates which were pretreated exclusively by means of heat-treatment (step (A)) or flaming (step (B)).

E) Variation in Pretreatment

In accordance with the working instructions indicated under A), in a further test series, PP/EPDM test plaques (PP108MF10 (Sabic), PP/EPDM blend, 2% by weight EPDM) were pretreated via step (A) and step (B). The period between the end of step (A) and the beginning of step (B) was varied here. Pretreatment was followed by the production of multicoat coating systems as described under D). The multicoat coating systems produced were again investigated by means of a steam jet test. Table 5 sets out the corresponding results in comparison to a multicoat coating system on PP108MF10 substrates pretreated only in accordance with pretreatment step (B) (flaming) (comparative multicoat coating system). The parameters reported are the ratios (in %) of the adhesion ratings defined as above for the systems pretreated according to step (A) and step (B), relative to the adhesion ratings for the comparative multicoat coating system (in each case rounded to full 5 percent or 10%). Here, in agreement with the rating system indicated above, smaller values denote better adhesion and smaller values than 100% denote better adhesion than the comparative system (100% corresponds to the standardized reference figure for the comparative system, in other words pretreatment only by pretreatment step (B) (flaming)).

TABLE 5

Adhesion properties of multicoat coating systems, variation in period between steps (A) and (B)

| Period between steps (A) and (B) | Adhesion[1] |
| --- | --- |
| Flamed after 5 minutes | 60% |
| Flamed after 10 minutes | 15% |
| Flamed after 30 minutes | 60% |
| Flamed after 60 minutes | 60% |
| Flamed after 120 minutes | 225% |

[1] Comparative multicoat coating system: multicoat coating system on PP108MF10, flamed only.

The results show the influence of the period between step (A) and step (B) in the course of the pretreatment on the quality of the adhesion of the coatings produced. The best adhesion is achieved with a period of 10 minutes. After 30 minutes and 60 minutes, poorer adhesion than in the case of the 10-minute system is already ascertained. The adhesion, however, continues to be better than in the case of the comparative multicoat coating system. After 120 minutes, the adhesion ascertained is already poorer than for the comparative system.

The invention claimed is:

1. A method for coating a plastic substrate with an aqueous coating composition comprising at least one organic polymer as a binder, the method comprising:
    pretreating the plastic substrate before the coating composition is applied, the pretreatment comprising the two following separate steps in the order stated:
    (A) heat-treating the plastic substrate at an ambient temperature in the range from 60° C. to 160° C. for a period in the range from 1 minute to 20 minutes,
    (B) flaming the surface of the plastic substrate pretreated as per step (A), there being a period of up to 90 minutes between the ending of step (A) and the beginning of step (B); and
    applying the coating composition the surface of the plastic substrate of the pretreatment step and subsequently curing the coating composition.

2. The method according to claim 1, characterized in that step (A) is carried out at an ambient temperature in the range from 70° C. to 120° C.

3. The method according to claim 1, characterized in that step (A) is carried out for a period in the range from 3 minutes to 8 minutes.

4. The method according to claim 1, wherein step (A) is carried out at an ambient temperature which is at least 5° C. lower than the Vicat softening temperature of the particular plastic substrate used.

5. The method according to claim 1, wherein the period between the ending of step (A) and the beginning of step (B) is in the range of from 1 minute to 60 minutes.

6. The method according to claim 5, wherein the period is in the range of from 5 and 20 minutes between the ending of step (A) and the beginning of step (B).

7. The method according to claim 1, wherein the plastic substrate comprises a plastic selected from the group consisting of polystyrene (PS), polyvinyl chloride (PVC), polyurethane (PUR), glass fiber-reinforced unsaturated polyesters, polymethyl methacrylate (PMMA), polyphenylene sulfide (PPS), polyoxymethylene (POM), polyphenylene ethers (PPE), polyphenylene oxide (PPO), polyurea, polybutadiene terephthalate (PBT), polycarbonate (PC), acrylonitrile-butadiene-styrene copolymers (ABS), polyolefins such as polypropylene (PP) and polypropylene (PP) modified with ethylene-propylene-diene copolymers (EPDM), and mixtures of these plastics.

8. The method according to claim 7, wherein the plastic substrate comprises polypropylene (PP) modified with ethylene-propylene-diene copolymers (EPDM).

9. The method according to claim 8, wherein the plastic substrate comprises the polypropylene (PP) modified with ethylene-propylene-diene copolymer (EPDM) fractions of no higher than 25% by weight.

10. The method according to claim 1, wherein the aqueous coating composition comprises a total fraction of 15% to 60% by weight, based on the total amount of the coating composition, of at least one organic OH-functional polymer as the binder and of at least one crosslinker selected from the group of fully etherified and/or partially etherified amino resins, monomeric and/or polymeric polyamines and/or monomeric and/or polymeric, blocked and/or free polyisocyanates.

11. The method according to claim 10, wherein the aqueous coating composition comprises at least one OH-functional polyurethane, polyester and/or poly(meth)acrylate resin as the binder and at least one fully etherified and/or partially etherified melamine-formaldehyde resin as the crosslinker.

12. The method according to claim 1, wherein the aqueous coating composition comprises at least 20% by weight of water, based on the total amount of the coating composition.

13. The method according to claim 1, wherein the aqueous coating composition is a pigmented basecoat material.

14. The method according to claim 13, wherein at least one further coating composition is applied after the pigmented basecoat material has been applied, and is cured jointly with the applied basecoat material, at least one of the further coating compositions being a clearcoat material.

15. A coated plastic substrate that has been coated by the method according to claim 1.

16. The coated plastic substrate according to claim 15, comprising a multilayer coating comprising a basecoat material and a clearcoat material.

* * * * *